US008511222B2

(12) United States Patent
Magg et al.

(10) Patent No.: US 8,511,222 B2
(45) Date of Patent: Aug. 20, 2013

(54) COFFEE MACHINE COMPRISING A CONTINUOUS HEATER

(75) Inventors: Johann Magg, St. Georgen (DE); Markus Obermaier, Nuβdorf (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1831 days.

(21) Appl. No.: 10/587,224

(22) PCT Filed: Jan. 19, 2005

(86) PCT No.: PCT/EP2005/050220
§ 371 (c)(1),
(2), (4) Date: Apr. 12, 2007

(87) PCT Pub. No.: WO2005/072584
PCT Pub. Date: Aug. 11, 2005

(65) Prior Publication Data
US 2008/0017044 A1   Jan. 24, 2008

(30) Foreign Application Priority Data
Jan. 30, 2004   (DE) .......................... 10 2004 004 821

(51) Int. Cl.
*A47J 31/00*   (2006.01)
(52) U.S. Cl.
USPC .............................. 99/302 R; 99/300; 99/295
(58) Field of Classification Search
USPC .................................. 99/288, 302 R, 300, 295
See application file for complete search history.

(56) References Cited

U.S. PATENT DOCUMENTS

| 3,711,681 | A | 1/1973 | Leuschner et al. |
| 4,066,201 | A | 1/1978 | Bleckmann |
| 4,371,777 | A | 2/1983 | Roller et al. |
| 5,367,607 | A | 11/1994 | Hufnagl et al. |
| 2003/0108343 | A1* | 6/2003 | Buzzi ............................ 392/403 |
| 2004/0009281 | A1* | 1/2004 | Green ........................... 426/590 |

FOREIGN PATENT DOCUMENTS

| DE | 25 51 779 | 5/1977 |
| DE | 83 35 620 U1 | 3/1985 |
| DE | 39 03 649 | 4/1990 |
| DE | 298 09 279 U1 | 10/1998 |
| DE | 198 52 883 | 1/2000 |
| EP | 0 393 385 | 10/1990 |
| EP | 1 321 708 | 6/2003 |
| GB | 2 318 173 | 4/1998 |
| WO | WO 03/030696 | 4/2003 |

OTHER PUBLICATIONS

International Search Report PCT/EP2005/050220.

\* cited by examiner

*Primary Examiner* — Reginald L Alexander
(74) *Attorney, Agent, or Firm* — James E. Howard; Andre Pallapies

(57) ABSTRACT

A coffee machine for preparing coffee, especially based on coffee pads, includes a continuous heater provided with a water-guiding tube that is thermally connected to at least one heating rod via at least one contact surface. A pump transports water through the continuous heater. The contact surface is embodied in such a way that it is flat between the tube and the at least one heating rod. The coffee machine structure provides a simple and cost-effective solution for a continuous heater, and ensures good heat transfer.

8 Claims, 2 Drawing Sheets

COFFEE MACHINE COMPRISING A CONTINUOUS HEATER

The invention relates to a coffee machine.

Coffee machines in the prior art operate according to different principles. The most common models are the so-called pressureless coffee machines. In these water flows from a storage container into an electrically heatable pipe. Particularly as a result of the evolution of steam in this pipe, heated water is then pushed through a riser to an outlet via which the heated water then drips into a coffee filter. The filter coffee can then flow from this coffee filter at atmospheric pressure into a pot.

In contrast, in espresso machines an elevated pressure prevails in the area of the coffee grounds, for example 15 bar. This is achieved by supplying water from a water container or another water supply to an electric-motor-driven pump which then supplies the water at high pressure via an electrically heatable area to a coffee grounds receiving device. This coffee grounds receiving device generally comprises a filter for receiving the coffee. In order to generate the high pressure in the coffee area, during operation the coffee grounds receiving device is located in an area which is sealed towards the atmosphere, which can be designated as a pressure chamber or brewing chamber.

In another coffee machine which operates on a different principle, it is provided to first transfer the water for preparing the coffee from a water container into a heatable intermediate container. From this intermediate container the heated water is passed to an electric-motor-driven pump from which it is supplied at elevated pressure, for example 2 to 3 bar, to a coffee grounds receiving device. In this case, it is provided that unlike in the espresso machine the coffee is not introduced into the coffee grounds receiving device in loose form as coffee grounds but is inserted in a retainer in the form of a coffee pad, that is, in compacted form surrounded by filter paper. The retainer with a retainer cover via which water is supplied can form a sealed pressure chamber. At the same time, the retainer for the coffee pads is allocated a plurality of functions. Firstly, the retainer provides a sealing surface so that a pressure chamber can be formed. Moreover, the retainer has an outlet opening from which the coffee can emerge. Furthermore, the coffee pad should be mounted in the retainer in a manner such that flow through the coffee pad is not impeded. Such a coffee machine occupies an intermediate position between a conventional pressureless coffee machine and an espresso machine.

In particular in connection with coffee machines which prepare coffee on the basis of coffee pads, the water conveyed by the pump can be heated in a continuous heater. WO 03/030696 A1 describes such a coffee machine. The continuous heater comprises a tubular section which is partially enclosed by heating elements embedded in cast aluminium. This entire arrangement with further components is surrounded by a housing whereby the continuous heater is inserted in the coffee machine housing. Such a solution is complex and thus associated with high costs.

It is the object of the invention to provide a coffee machine with a continuous heater which can be manufactured simply and cost-effectively, and in particular allows good heat transfer between the heating rods and the water-guiding tube.

The invention builds on the generic coffee machine in that the at least one contact surface between the pipe and the at least one heating rod is embodied as flat. This type of continuous heater can be manufactured particularly simply. For example, a flat contact surface can be produced in the form of a flattened pipe which can be provided, for example, by simply pressing together a pipe area. As a result of the flattened areas, large areas are provided for heat transfer between the pipe and a flattened heating rod. Since no cast parts are required, the mass of the continuous heater is comparatively low.

It is usefully provided that at least two heating rods are thermally connected to the pipe by means of respectively at least one contact surface. Compared to a single heating rod, an increased heating power is provided by providing two heating rods.

It is particularly useful that respectively two heating rods are provided on opposite sides of the pipe. Uniform heating of the pipe is thereby achieved.

The coffee machine according to the invention is preferably configured so that the pipe and the at least one heating rod are held together by a sleeve. Such a sleeve is to be preferred to a complex housing with regard to manufacturing simplicity. The sleeve can be made of heat-resistant plastic or of metal.

It is usefully provided that a temperature sensor is provided on the sleeve. Since the sleeve is preferably located at the centre of the elongated continuous heater to hold the components securely together, it is located at a preferred site for a temperature sensor. In this respect, it is possible to arrange a temperature sensor in the area of the sleeve and mount this on the sleeve.

In particularly preferred embodiments of the present invention, it is provided that the pipe has ends into which preferably hose-like connecting pieces of a water supply and/or a water exit can be inserted. These flexible tube connecting pieces can be internally or externally sealing and provide a simple possibility for pushing on a hose for supplying or removing water.

It is usefully provided that the connecting pieces are provided with seals. By this means a reliable seal can be provided at the transition between the pipe of the continuous heater and the flexible tube connection pieces.

In this connection, it is particularly useful that the connecting pieces are made of plastic and comprise securing means for securing the continuous heater on the housing of the coffee machine. A heat-resistant plastic provides good heat insulation between the continuous heater and the housing or the hoses. Furthermore, securing means for centring the continuous heater in the housing and which provide the possibility of securing the continuous heater, can be moulded simply on the flexible tube connecting pieces made of plastic.

It is likewise useful if holders for further components are provided on the securing means. For example, these components can comprise sensors or switches.

The invention is based on the finding that a continuous heater for a coffee machine can be fabricated simply if this substantially consists of a flattened pipe and heating rods abutting thereagainst.

The invention is now explained in detail with reference to the accompanying drawings using particularly preferred embodiments. In the figures.

Figure 1:
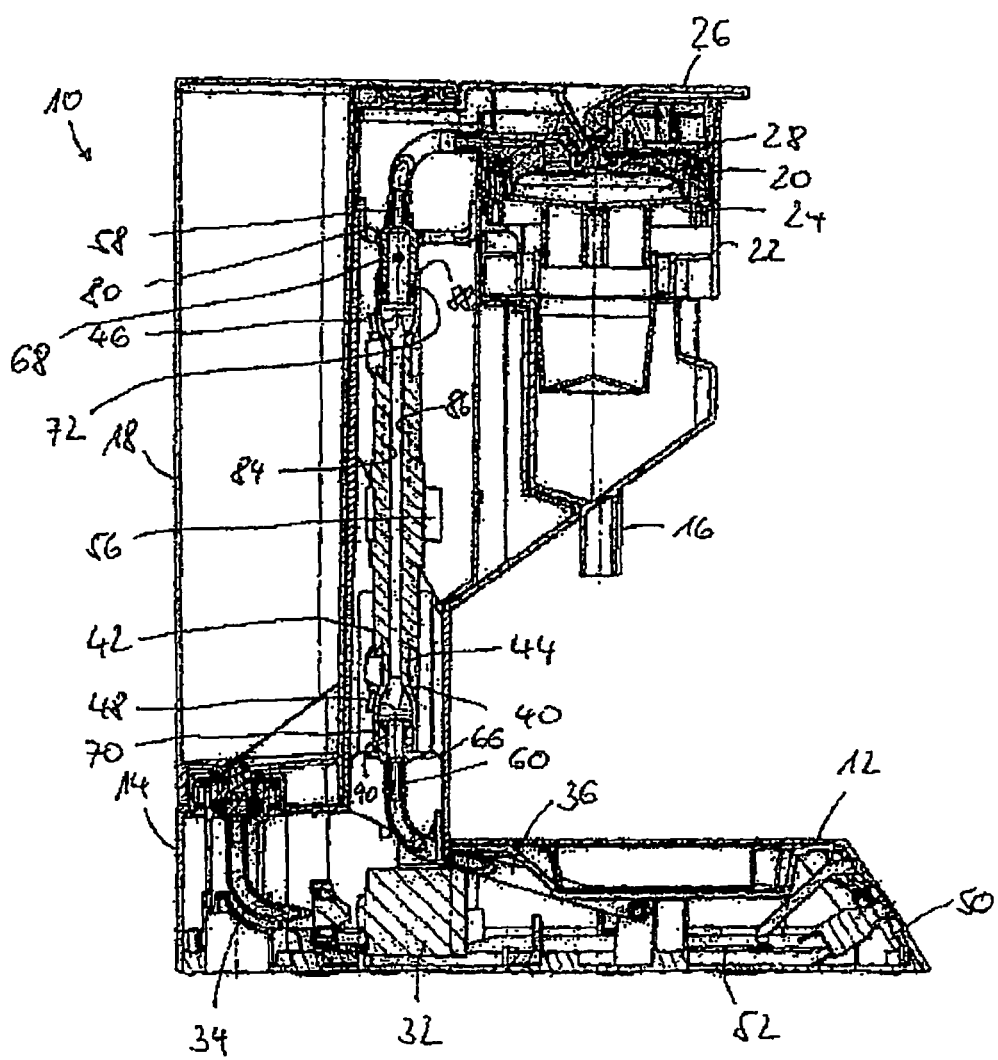
FIG. 1 is a sectional view of a coffee machine to explain the invention.
Figure 2:
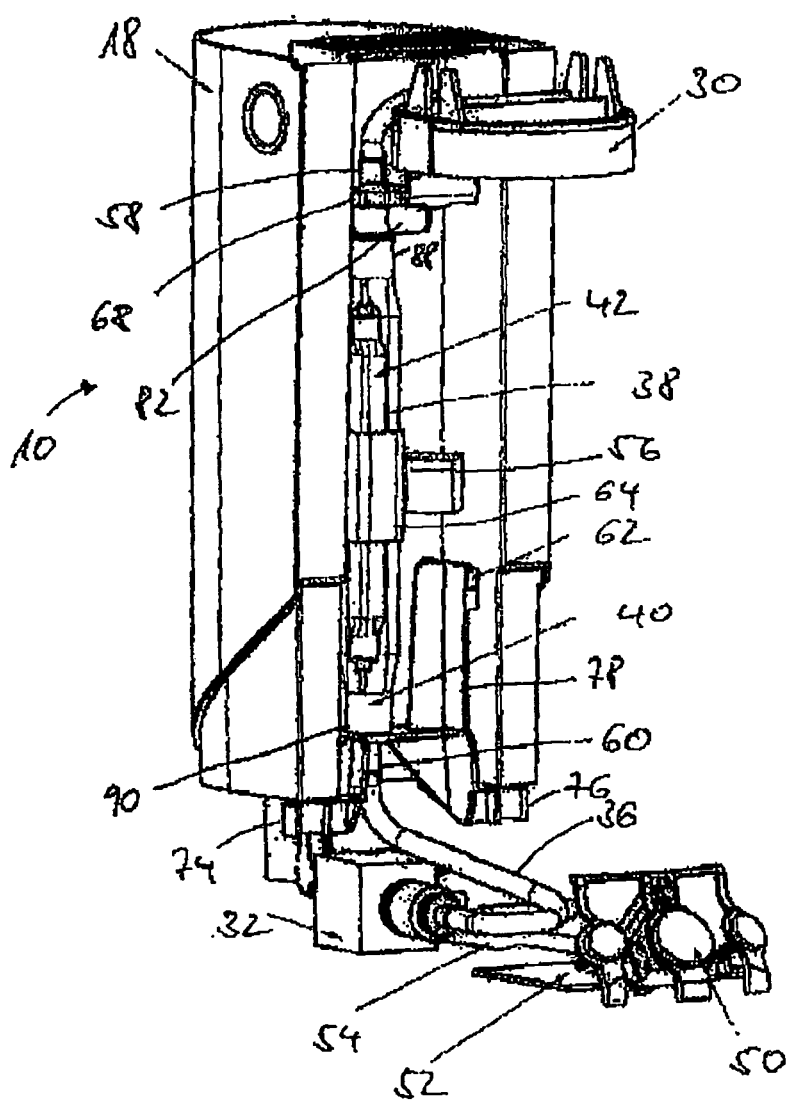
FIG. 2 is a perspective view of a housing part as well as components arranged in the housing to explain the invention; and In the following description of the drawings the same reference numerals denote the same or comparable components.

FIG. 1 shows a sectional view of a coffee machine to explain the invention. FIG. 2 shows a perspective view of a housing part as well as components arranged in the housing to explain the present invention. The coffee machine 10 comprises a flat front portion 12 and a columnar rear assembly 14. Cups for removing coffee via an outlet 16 can be arranged on the front portion 12. A water container 18 is inserted in the rear assembly 14. The rear assembly 14 further comprises a brewing chamber 20 formed by a coffee pad retainer 24 which can be supplied with a drawer and an elastic retainer cover 28 as the upper portion of the brewing chamber 30. A lever mechanism is provided with a lever 26 in order to seal the coffee pad retainer 24 and the retainer cover 28 with respect to one another after inserting the drawer 22. In the state shown the lever mechanism pulls the coffee pad retainer 24 towards the retainer cover 28. If the lever 26 is shifted backwards by 90°, the coffee pad retainer 24 is lowered so that it can be removed from the coffee machine 10 together with the drawer 22.

Components for supplying water, for heating water and for controlling these processes are provided inside the housing formed by the front portion 12 and the rear assembly 14. Located in the lower housing area at the boundary between the front portion 12 and the rear assembly 14 is a pump 32 to which water is supplied from the water container 18 via a hose 34. The pump 32 is connected to the continuous heater 38 by means of another hose 36. Important components of this continuous heater 38 are a pipe 40 used to carry water and two heating rods 42, 44, These heating rods 42, 44 each have two electrical connections 46, 48 to which the heating voltage is applied. Provided on the front portion 12 of the coffee machine 10 is a keypad 50 which is connected to a printed circuit board 52, said printed circuit board 52 preferably controlling all the functions of the coffee machine, especially the functions with regard to the conveyance and heating of the water. Starting from the printed circuit board 52 there is provided a cable run 54 which combines the electrical leads via which the electronic controller delivers its control commands and receives input information. This input information particularly relates to the temperature of the continuous heater detected by a temperature sensor 56 and preferably further temperature information which is recorded by temperature sensors at measuring points 58, 60 downstream or upstream from the continuous heater 38 in the direction of flow. A reed switch 62 is further provided in the rear assembly 14. The task of the reed switch 62 is to electrically detect a minimum filling level in the water container 18. For this purpose a float comprising a magnet is located vertically displaceably in the water container 18. When the water falls below a minimum filling volume in the water container 18, the magnetic float is located near to the reed switch 22 and makes this switch on, closing a circuit which transmits a signal to the electronic controller that the level is too low. If the level in the water container is lower than the minimum filling volume, the coffee machine cannot be operated. The continuous heater 38 can also have a sensor which prevents any running dry during the heating process.

Contact surfaces 84, 86 of the heating rods 42, 44 are constructed as flat and are connected to corresponding contact surfaces or flattened sections of the pipe 40. Thus, good abutment and consequently good heat transfer can be achieved between the heating rods 42, 44 and the pipe 60. The contact surfaces 84, 86 preferably extend over the entire or almost the entire length of the continuous heater 38, a radial position of the contact surfaces 84, 86 being shown by the broken lines in FIG. 1 as an example. The arrangement of pipe 60 and heating rods 42, 44 is held together by a sleeve 64 which can be made of heat-resistant plastic or metal. The temperature sensor 56 is located in the area of this sleeve 64. Flexible tube connecting pieces 66, 68 are attached to the ends of the pipe 60. In the present exemplary embodiment, these are inserted in the pipe 60 and fitted with a circumferential seal 70, 72, for example, an O-ring. Securing means 74, 76, 78, 80 are moulded onto the flexible tube connecting pieces 66, 68 made of heat-resistant plastic, only some of the securing means being identified with reference numerals as an example here. These securing means 74, 76, 78, 80 are used to secure and centre the continuous heater 38 in the housing and also provide receiving elements for additional components, for example, a receiving element for the reed switch 62 in the securing means 78. A safety valve 82 is furthermore built into the flexible tube connecting piece 68. The continuous heater 38 can thus be mounted as a complete unit with the flexible tube connecting pieces 66, 68 and the hoses placed thereon and can easily be inserted in the housing as a result of centring properties.

The features of the invention disclosed in the preceding description, in the drawings and in the claims can be important for carrying out the invention both individually and also in any combination.

REFERENCE LIST

10 Coffee machine
12 Front portion
14 Rear assembly
16 Outlet
18 Water container
20 Brewing chamber
22 Drawer
24 Coffee pad retainer
26 Lever
28 Retainer cover
30 Brewing chamber upper portion
32 Pump
34 Hose
36 Hose
38 Continuous heater
40 Pipe
42 Heating rod
44 Heating rod
46 Electrical connection
48 Electrical connection
50 Keypad
52 Printed circuit board
54 Cable run
56 Temperature sensor
58 Measurement point
60 Measurement point
62 Reed switch
64 Sleeve
66 Flexible tube connecting piece
68 Flexible tube connecting piece
70 Seal
72 Seal
74 Securing means
76 Securing means
78 Securing means
80 Securing means
82 Safety valve
84 Contact surface
86 Contact surface
88 End
90 End

The invention claimed is:

1. A coffee machine for preparing coffee using coffee pads, which comprises a continuous heater provided with a water-guiding pipe that is thermally connected to two heating rods provided at opposite sides of the pipe by means of contact surfaces, and a pump for transporting water through the continuous heater, wherein the all of the contact surfaces of the pipe and the heating rods are flat, wherein the pipe has ends into which hose-like flexible tube connecting pieces of a water supply and a water exit are inserted, and wherein the connecting pieces are made of plastic and comprise securing means for securing the continuous heater on a housing of the coffee machine, and holders provided on the securing means, the holders being configured to receive additional components of the coffee machine.

2. The coffee machine according to claim 1, wherein the pipe and the two heating rods are held together by a sleeve.

3. The coffee machine according to claim 2, wherein a temperature sensor is disposed adjacent the sleeve.

4. The coffee machine according to claim 1, wherein the connecting pieces are provided with seals.

5. A coffee machine for preparing coffee using coffee pads, the coffee machine comprising:

a continuous heater provided with a water-guiding pipe;

two heating rods provided on opposite sides of the pipe and thermally connected to the pipe by corresponding contact surfaces, wherein all of the contact surfaces between the two heating rods and the pipe are flattened; and a pump cooperable with the continuous heater and transporting water through the continuous heater, wherein the pipe has ends into which hose-like flexible tube connecting pieces of a water supply and a water exit are inserted, and wherein the connecting pieces are made of plastic and comprise securing means for securing the continuous heater on a housing of the coffee machine, holders provided on the securing means, the holders being configured to receive additional components of the coffee machine.

6. The coffee machine according to claim 5, wherein the pipe and the two heating rods are held together by a sleeve.

7. The coffee machine according to claim 6, wherein a temperature sensor is disposed adjacent the sleeve.

8. The coffee machine according to claim 5, wherein the connecting pieces are provided with seals.

* * * * *

UNITED STATES PATENT AND TRADEMARK OFFICE
CERTIFICATE OF CORRECTION

PATENT NO.       : 8,511,222 B2
APPLICATION NO. : 10/587224
DATED            : August 20, 2013
INVENTOR(S)      : Magg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2087 days.

Signed and Sealed this

Fifteenth Day of September, 2015

Michelle K. Lee
*Director of the United States Patent and Trademark Office*